INVENTOR
JAN WILHELM
VAN GOLVERDINGE
SCHUT

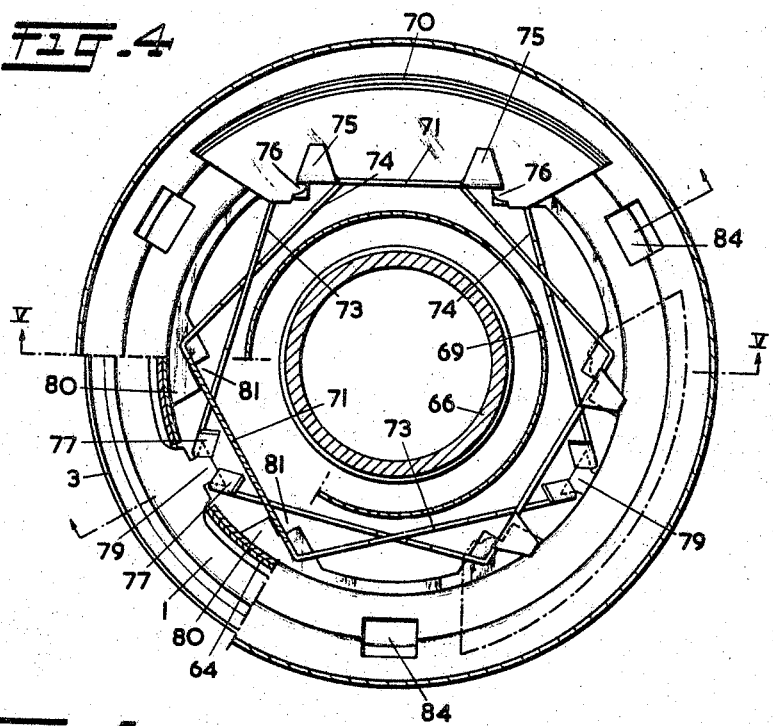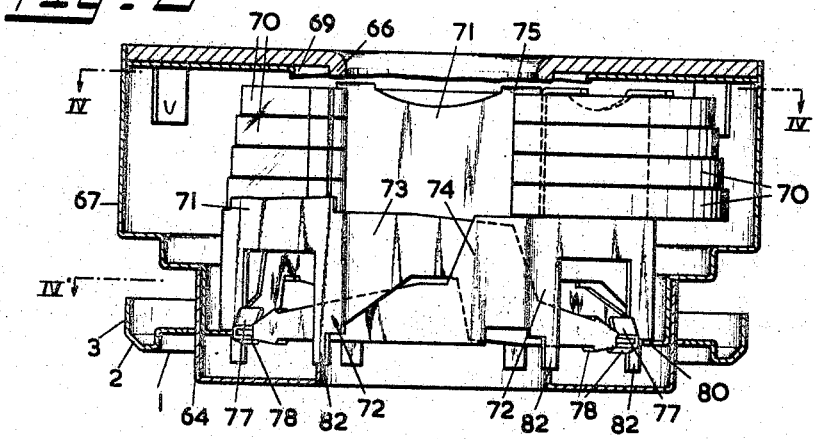

INVENTOR
JAN WILHELM
VAN GOLVERDINGER SCHUT

United States Patent Office 3,337,704
Patented Aug. 22, 1967

3,337,704
CENTRIFUGALLY OPERATED ELECTRICAL SWITCH HAVING A ROTOR AND STATOR
Jan Wilhelm van Golverdinge Schut, 125 Bentinckstraat, The Hague, Netherlands
Filed Oct. 21, 1965, Ser. No. 508,183
Claims priority, application Netherlands, July 25, 1959, 241,675
11 Claims. (Cl. 200—80)

This is a continuation-in-part of my application Ser. No. 43,796 filed July 19, 1960.

The present invention relates to a centrifugally operated switch, in particular a centrifugally operated switch for controlling the starting winding circuit of a single-phase induction motor.

The centrifugally operated switch to which the invention relates consists of a rotor and a stator and is provided with cam means for effecting co-operation of the rotor and stator. The rotor is provided with centrifugal weights radially reciprocable under the respective influence of centrifugal power and spring return means; and the stator is provided with electrical switch contacts, which can be actuated via the cam means through radial reciprocation of the centrifugal weights.

The object of the invention is to provide a centrifugally operated switch of this kind that interrupts the circuit by positive instantaneous action, even if the motor starts slowly, that functions accurately and reliably.

Another object is to provide a switch having small dimensions and that is capable of producing high contact pressure in comparison with its size.

In a centrifugally operated switch according to the invention the cam means consist of rotor and stator cam means comprising a cam ring axially reciprocable between two end positions and at least one cam member adapted to slide peripherally over the cam ring and at the same time to reciprocate radially between two end positions. The cam means are provided with at least one cam surface portion inclined to the rotor axis and changing over into a cam surface portion which extends parallel to the direction of the reciprocable movement of the rotor cam means and which is an engaged cam surface portion when the rotor and the stator cam means cooperate in one end position of their reciprocating movement. The beginning of the movement for interruption of the electrical contact is not thereby influenced by the reaction of the contact pressure, the continuation of this movement is stimulated by the force of said reaction and the movement is not impeded by friction between the cam ring and the cam member sliding over each other.

The invention also provides for a rotor construction in which an actuating ring is guided in parallel without friction.

The invention will be described further with reference to the drawings, in which further details will be seen.

The drawings illustrate diagrammatically construction examples of a switch according to the invention.

FIG. 4 is a sectional view of the rotor of a switch according to the invention taken on the line IV—IV and IV' respectively in FIG. 5;

FIG. 5 is a sectional view of the rotor taken on the line V—V in FIG. 4;

Figure 1:
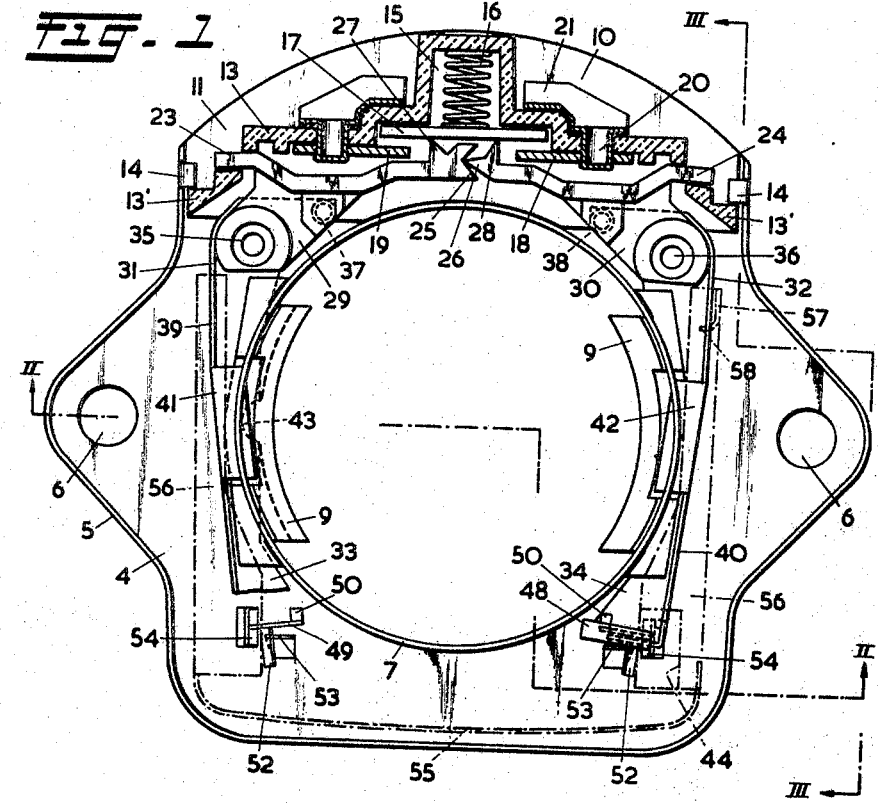
FIG. 1 is an axial view, partly in section, of the stator of a switch according to a first embodiment of the invention the cover having been omitted.
Figure 2:
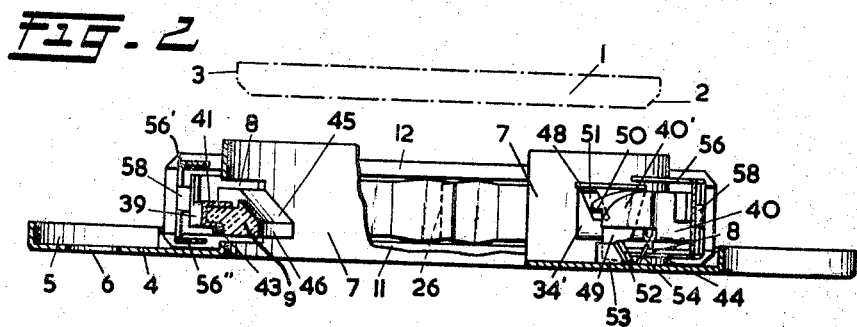
FIG. 2 is a section taken on the line II—II in FIG. 1.
Figure 10:
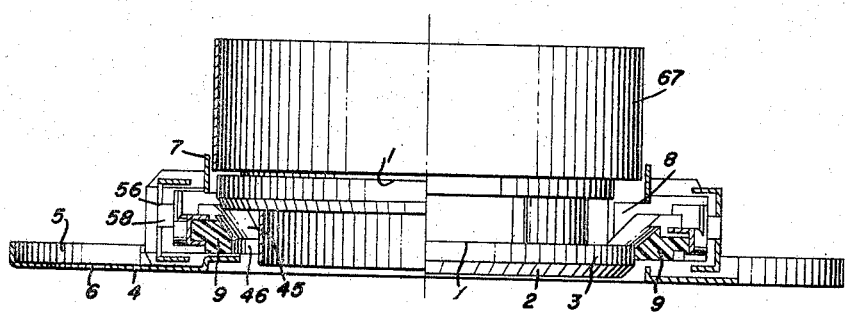
FIG. 10 is an elevation view partly in section of a rotor and stator of a switch according to the invention with the left and right hand portions thereof illustrating different operative positions of various elements.

In FIGS. 1, 2 and 10 the stator is operated by an axially reciprocable metal cam ring 1, indicated by dotted lines at a distance chosen at random above FIG. 2, belonging to a rotor. The ring 1 is provided with a conical surface 2 and a cylindrical outer surface 3.

The stator is provided with a mounting plate 4 made of sheet metal with a stiffening rim 5 and screw holes 6 for securing it. A cylindrical inner wall 7 is provided with two rectangular openings 8 diametrically opposite one another, through which project cam members 9 made of a wear-resistant synthetic material.

At one end of the mounting plate 4 a contact casing 10 is mounted. This casing is a synthetic part moulded in one piece, for example of synthetic resin, consisting of a base plate 11, a top place 12 and an intermediate partition 13 and end portions 13' at right-angles to and joining plates 11 and 12. The contact casing 10 is held in its place by the base plate 11 lying against the inner wall 7 of the mounting plate 4, and is held pressed against the mounting plate 4 by lips 14 of the mounting plate collar or rim 5, said lips engaging the ends 13' of the partition 13.

The shaped partition 13, together with the base and top plates 11 and 12 form a chamber 15 open axially at one end, in which a contact closing spring 16 is disposed. The spring 16 biases or presses on a movable bridge contact 17 disposed opposite fixed contacts 18 and 19 and thereby biased toward a contact-closing position. The contacts 18 and 19 are attached to the partition 13 by means of hollow rivets 20 extending through apertures in the partition 13. These rivets 20 also secure connecting lips or cable lugs 21 to the contacts 18 and 19.

The partition is interrupted near its ends, thus forming separate end partitions 13' which, with the partition 13, form apertures into which the ends of bell crank lever arms 23 and 24 extend. The lever arms are moulded of synthetic resin and disposed substantially in line. The lever arms 23 and 24 mutually engage at their inner ends forming an articulated joint by means of a V-shaped groove 25 and a knife edge 26 respectively, and they are pressed together by a spring, as will be described below. Both arms 23 and 24 are each moulded in one piece with side arms, 29 and 30 respectively, and each have a projection 27 and 28 respectively, near inner extremities in order to enable them to press or bear on the contact 17.

Both side arms 29 and 30 each have an extension arm, 31 and 32 respectively, secured to them. The extension arms 31 and 32 are of an L-shape along substantially their length and consist of sheet metal parts having flanges 33, 39 and 34, 40 of which the flanges 33 and 34 are lower flanges disposed parallel to the mounting plate 4. Hollow rivets 35, 37 and 36, 38 are provided in the thicker parts of the side arms 29 and 30.

The arms 31 and 32 have flanges 39 and 40 on which are centrally disposed lips 41 and 42 respectively, bent parallel to the lower flanges. The two similar cam members 9 lie at full length on a respective one of the lower flanges 33 and 34, upon which the cam members are held by the lips 41 and 42, which extend into a recess in the upper part of the members 9. The members 9 have a bluntly shaped corner formed by their rear surfaces, so that they are in relation to the arms 31 and 32 to a limited extent rockable. Their pivot is formed by a semi-cylindrical cam 43 disposed underneath them and fitting in a corresponding recess 43′ in the lower flanges 33 and 34.

In their inward end position the cam members 9 lie with their extremities against the outside of the inner wall 7 and project with their middle portions through the rectangular openings 8. The middle portions are provided with a conical or bevelled surface 45 and a cylindrical surface 46. These surfaces slidably co-operate with the corresponding surfaces 2 and 3 of the rotor ring 1.

Figure 9:
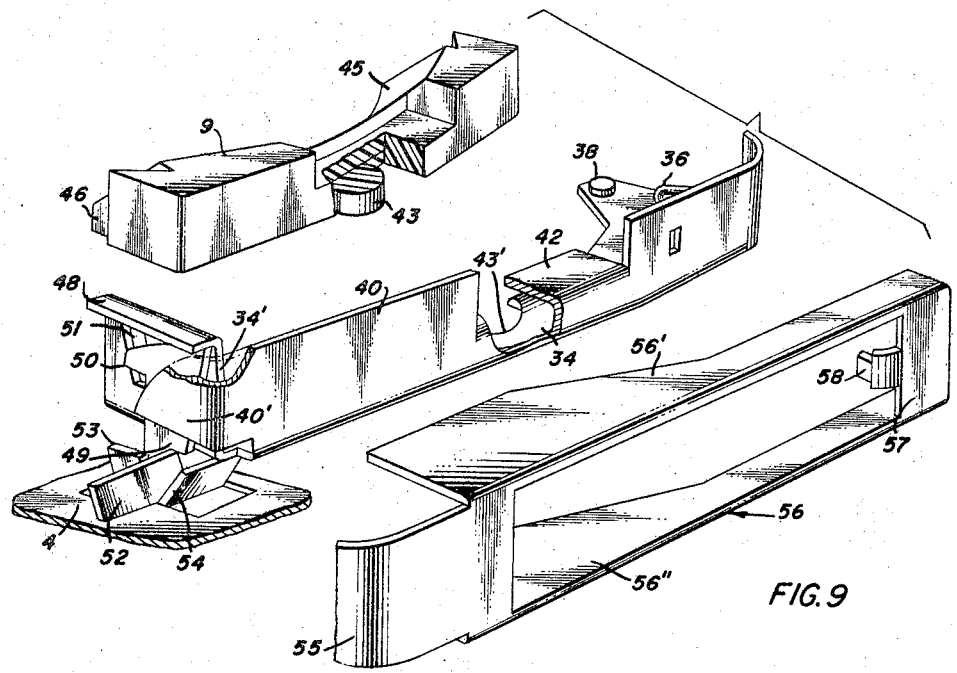
FIG. 9 is an exploded view of some of the parts of the stator shown in FIGS. 1–3.

The extremities of extension arms 31 and 32 are supported against the mounting plate 4 by roller bearing elements 49 to reduce friction. Thus each of the lower flanges 33 and 34 has an end portion bent through a swan neck to provide an end lip 48 parallel and in spaced relation to said lower flanges 33 and 34. The end portion of member 31 is broken away in FIG. 1 to show more clearly the co-operating parts. The lips 48 rest on disc-shaped elements 49 provided with curved end and upper bearings edges. The elements 49 are restrictedly movably held in an upright position and confined by a plurality of lips. As can be seeen from FIGS. 1, 2 and 9 element 49 is enclosed between part 34′ which is the center part of the swan neck bent portion in the flange 34 and the part 40′ which is the lower end of the flange 40 bent through 90°. A transverse lip 50 of the part 49 projects through the slot 51 in part 34′ and another transverse lip 52 of part 49 extends between two bent up lips 53 and 54 of the mounting plate 4.

The bell crank levers 23, 31 and 24, 32 respectively are constantly pressed towards each other by a leaf spring 55, which engages with rigid arms on the arms 31 and 32 at points intermediate the centers of the members 9 and the pivots of the bell crank levers. The rigid arms 56 consist of two parallel strips 56′ and 56″, obtained by bending over the spring material at right angles, disposed registering above one another, the lower one 56″ is disposed around the mounting plate lips 53 and 54 with a recess 44 and between which the spring material has been substantially cut away except at the end of the strips so as to leave them at one end interconnected by and integral with an end portion of the actual spring part 55 and at the other end interconnected by a cross strip 57 on which there is a lip 58, which engages in a groove in an upright flange of one of the extension arms 31 and 32. The spring part 55 is pre-bent in such a way that it is almost straight when fitted in position.

The lever arms 23 and 24 fit closely but movably between the lower and upper plates 11 and 12 respectively of the contact casing 10, while the lips 48 of the arms 31 and 32 are closed in between the circular segments 49 and an indentation 47 in the cover 59 with little play, so that the bell crank levers are stabilised in their plane. The force of the spring 55 holds them engaged at 26 and 25, and it also holds them pressed against the members 9, which lean either against the inner wall 7 or against the ring 1.

Figure 3:
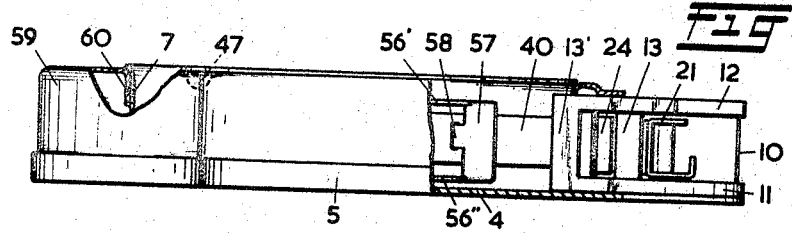
FIG. 3 is a side elevation, partly in section, taken on the line III—III in FIG. 1.

The outside of the cover 59 fits against the rim or collar 5 of the mounting plate 4 except in the middle portion thereof at two opposite sides where the mounting plate has ears in which the holes 6 are situated outside the cover 59. The inside collar 60 of the cover 59 fits around the inner wall 7 of the mounting plate 4. The inner wall 7 is slightly expanded at the top to grip securingly over the inner edge of the cover 59 as seen in FIG. 3.

The stator contacts are operated by the axial to and fro movement of the rotor ring 1. When the ring 1 moves into the stator space the conical ring surface 2 presses the members 9 outwardly by engaging on their conical surfaces 45, whereby the bell crank levers 23, 31 and 24, 32 pivot and the edges 27 and 28 are released from the contact 17, so that the latter is pressed against the fixed contacts 18 and 19 by the spring 16. Thus, in the closed contact position the contact 17 is free from the rest of the operating mechanism, so that any vibration of the switch parts that may occur cannot influence the contact pressure. In one of the terminal operating positions the cylindrical surfaces 46 of the members 9 rest against the cylindrical part 3 of the ring 1. This enables the latter to move axially to a certain extent without causing any alteration in the functioning of the switch, and allows for some axial play.

A certain play of the stator with relation to the rotor can also be tolerated in all radial directions since on the one hand the rockably supported members 9 can always orient themselves to the axial center of the ring 1 and on the other hand the bell crank lever arms 23 and 24 are adapted to slide in the hinge apertures formed between the partitions 13 and 13′.

As long as the cylindrical surfaces 46 of the members 9 lean against the cylindrical ring surface 3, the spring 55 can not exert axial force on the ring 1 and so cannot influence the number of revolutions per minute at which the centrifugal force brings about the interruption. Nor is this possible as a result of friction between the cam members 9 and the cam ring 1, because switching only occurs if the motor is running, so that the resulting relative movement produced between the ring 1 and the members 9 during switching is a movement along a helical line with a very low pitch. Consequently, the resulting frictional force along this helical line can only have a component, in an axial direction approaching zero. Moreover, since the tangential component of the frictional force is overcome by the force of the motor, it follows that the friction between the ring 1 and members 9 is negligible with respect to the switching movement. Thus the force of the return spring present in the rotor is not required to any practical extent to overcome the friction between the ring 1 and members 9 as they slide relative to each other during the return movement, but can practically entirely be used for stressing the spring 55. Consequently, the switch can have small dimensions or, alternatively, it is possible to achieve greater contact pressure for given dimensions.

These improvements will appear to full advantage when friction is prevented or reduced substantially in the rest of the switch construction. This requirement has been met in the stator shown in FIGS. 1–3, 9 and 10 as described above and also in the rotor construction according to the invention by floatingly supporting and guiding a transmission ring or a similar ring like element by swinging members only. The swinging members are pivotally arranged in the rotor and are pivotally connected to the ring like element, both hinge axes of each swinging member extending in parallel at right angles to the rotor axis. The swinging members are arranged other than diametrically so that the pairs of parallel hinge axes are not parallel and intersect or cross each other. The ring like member is permanently maintained parallel to a same plane of the rotor, since it is not possible for it to swing about more than one axis of the intersecting or crossing axes at the same time, therefore the ring like element can only make axial and rectilinear movement without tilting and thereby the swinging members connected to the ring like element swing synchronously through equal angles. The swinging members also can carry the centrifugal weights. The swinging members normally have two arms for carrying the ring like member. They can completely determine the radial, normally concentric, position of the ring like member, therefore it is sufficient only to floatingly guide it by means of those articulated members, which produce hardly any friction and only a small space will be taken up.

Preferably there are more than two swinging members such that the consecutive swinging member arms around the rotor axis cross, either over or under or through each other, the pivot joints of the ring like member with the various swinging members thereby alternating.

FIG. 4 illustrates an axial view of the inner parts of an embodiment of a rotor in an intermediate position whereby one of the three centrifugal weights has been omitted and the appurtenant part of its swinging member broken away and a second one is only indicated by a dotted line. The casing and hub parts are largely shown in cross section on the line IV—IV in FIG. 5 and in a smaller sector on the line IV' in FIG. 5, in which sector the fracture of the swinging member broken away is indicated by hatching.

FIG. 5 illustrates a view of the inner parts shown in FIG. 4, at right angles to the axis, wherein the centrifugal weight indicated with dots and dashes in FIG. 4 is depicted by solid lines, one of the swinging members, as in FIG. 4 and the hub have been partially broken away, and the encasing parts are reproduced in cross section on the line V—V in FIG. 4.

Figure 6:
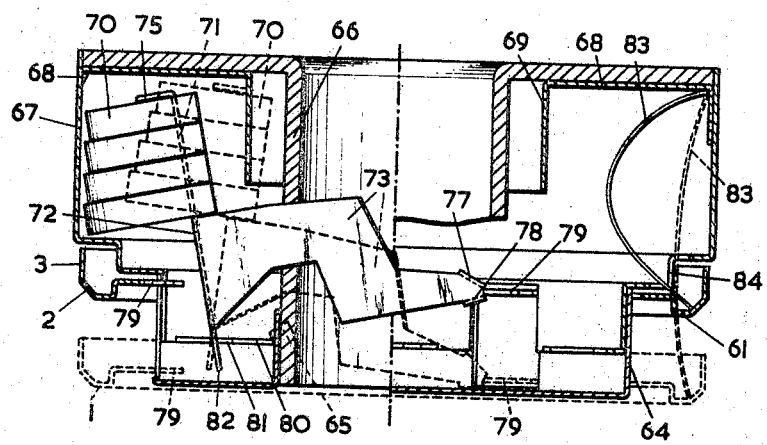
FIG. 6 is a sectional view of the rotor taken on the line VI—VI in FIG. 4.

Finally, FIG. 6 represents a cross section on the line VI—VI in FIG. 4, however, two of the centrifugal weights with appurtenant pivot members have been omitted and the other is shown with solid lines in its operative position and with dotted lines in its normal position.

The rotor in the figures is provided with a ring 1, corresponding to the ring 1 drawn in dotted lines in FIG. 2, which has a conical surface 2 and a cylindrical surface 3. The ring 1 surrounds a closing cap 64, which cap has an outer and an inner cylindrical wall, the inner wall being secured as by deformations 65 (FIG. 6) to the rotor hub 66, and the outer wall being fitted over an end portion of the rotor cap 67, which end portion is of reduced diameter. The other end of the cap 67 is closed by a flange on the rotor hub 66 and by the flange of an inner wall 69, which inner wall determines the inward end portion of the centrifugal weights 70, said flanges lying upon each other and abutting against projections 68 in the rotor cap 67.

The centrifugal weights 70 consist of stacked plates and are mounted on the flat center part 71 of the U-shaped swinging members 72, whereby they are closed in between pairs of arms 73 and 74 of the swinging members 72 and the flat center part 71 and lips 75 thereof and furthermore catch around the center part 71 with corner pieces 76 of their stacked plates.

The swinging members 72 are equal and are made of thin spring metal. Their arms 73 have a recess at the lower edge, thus enabling them to reach over the arms 74 which have a recess at the upper edge, of the adjacent swinging member. Moreover, the arms 73 and 74 reach under the center part 71 with a recess at the lower end, of adjacent swinging members and are located with bent lips 77 and 78 respectively above and below the T-shaped lips 79 of the ring 1 which lips extend inwardly through slits in the cap 64 and in the cap 67. The ends of the arms 73 and 74 of each adjacent pair of the three swinging members 72 are linked in pairs against a ring lip 79, of the ring 1 which thereby is supported and guided at three positions distributed over its inner periphery by the swinging members 72 which, on account of their being mutually linked by means of the ring 1, can only perform synchronised swinging movements, and thus ensure parallel guidance of the ring 1.

The swinging members are fulcrumed, at the base of their center part 71 on the marginal parts 80 of the largely cut away portion representing the bottom of the casing cap 67. The edge parts 80 have angular recesses 81, into which the lips 82 of the center part 71 reach and in which they are held in position by the action of the functional forces, namely the force of the return spring, and centrifugal force during rotation.

Radial forces on the ring 1 will be translated into pressure forces over the pairs of arms 73 and 74, and the ring 1 will not be appreciably moved from a central position.

The return force is supplied by the straightening of the buckling springs 83 placed in the free sectors between the centrifugal weights 70, and held in a compressed condition by the peripheral portion of the cross flange of the inner wall 69 and the bottom of the recess formed in the ring 1, into which they pass through sltis 84 in the bottom of the casing cap 67. A translation member as the ring 1 described above can be applied in any switch in which an actuating force has to be transmited to a stator, either axaially or radially.

Figure 7:
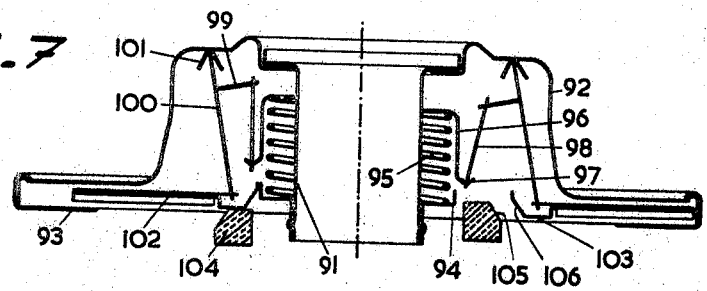
FIG. 7 is schematically a side elevation of the rotor of a second embodiment of a switch according to the invention.

In a rotor according to the schematic FIG. 7, a hub 91 has a casing cap 92 attached to it and a ring 93 partially closes a compartment at the bottom side. A return spring 95, which carries a co-axial ring member 96, rests on a ring or flanged collar 94 attached to hub 91. The ring member 96 forms with its lower flange four V-shaped pivot bearings 97, disposed in a square, in each of which a flat auxiliary swinging member 98 rests. Two swinging members 98 are visible in the figure. Their upper ends rest pivotally on transverse arms 99 of main swinging members 100, which rest in pivot bearings formed by lips 101 of the cap 92. The main swinging members 100 are hinged at their lowered and to centrifugal weights 102 which are composed of plates and at their radially outer ends are guided between the lower flange of the cap 92 and the ring 93 and which form cam members to actuate an auxiliary movable ring 104 mounted in the stator by cam action.

In the left half of FIG. 7 the movable parts are represented in a position matching with the inward end position of the centrifugal weights 102.

One of the plates composing the centrifugal weights 102 rests with its shaped inner end in the inward end position against the ring 94. In this position the plate presses the cam ring 104 of the stator, not further shown in the figure, downwardly with the fllat surface part 103, so that the contacts in the stator are closed.

When the centrifugal weights reciprocate, the conical surface 105 of the cam ring 104, which is axially subject to spring action, slide along the inclined surfaces 106 of the centrifugal weights 102, so that the cam ring 104 moves up and down, thus causing switching. In the inward end position of the main swinging members 100 the force exerted upon them by the ring 104, only produces a small momentum round the fulcrum determined by the lips 101.

The spring 95 keeps the auxiliary swinging and the main swinging members 98–100 constantly connected in their pivots, the parallel hinge axes of the different pairs of interconnetced swinging members intersecting and crossing each other, the ring element 96 can only carry out a rectilinear and parallel movement and at the same time allows for synchronised and equal movement of the centrifugal weights only.

Figure 8:
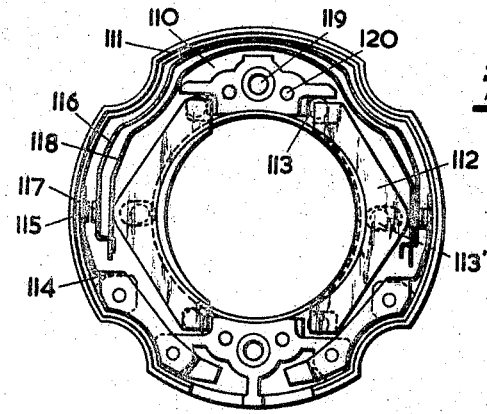
FIG. 8 is a sectional view illustrating a stator of a third embodiment of a switch according to the invention.

FIG. 8 represents an axial view of a stator without cover. The stator is a variant of the stator in FIG. 1. In the stator a mounting plate 110 is moulded of synthetic resin with a stand-up peripheral edge 111. There are two cam members 112 lodged opposite one another on balls 113 are radially movable thereupon over the mounting plate 110. On the left of the figure a cam member 112 is shown in the inward end position and on the right a cam member 112 is shown in the outward end position. The cam members 112 can slide over a rotor cam ring corresponding with the ring 1 in FIG. 2, with their conical and cylindrical surfaces turned towards the center. The balls 113' disposed below the center part of the cam members 112 extend about half way into recesses of the cam members 112 and about half way into recesses of the mounting plate 110, so that these balls form trunnions around which the cam members 112 can pivot in order to adjust themselves with regard to the ring of the rotor if it is not quite centrifcally fitted in relation to the stator. Along the edge 111 two fixed connecting lips 114 with contacts 115 are disposed. The contacts 115 can be bridged by the outwards springing contact spring 116 with the contacts 117. The hooked ends of the spring 116 have apertures into which the ends of the return spring 118 contracting inwardly extend with some play. If the rotor ring holds the cam members 112 outwardly the return spring 118 and the contact spring 116 do not touch, so that the latter is uninfluenced in holding the contacts 115 and 117 closed. If the rotor ring is drawn out between the cam members 112, the spring 118 moves the ends of the contact spring 116 and the cam members 112 into the inward end position. In actual fact the principle on which it works is mainly that described in connection with FIGS. 1–3 and 10. The holes 119 serve to receive fastening screws, the holes 120 to rivet an annular covering plate to lie slightly above the cam members 112.

All cam means described above have been depicted with bevelled edges forming inclined cam surface portions. However, it is sufficient for the operation of the mechanisms described if only the cam ring or the cam member or cam members are provided with such bevelled edges, as shown in FIG. 11 and FIG. 12 respectively.

Figure 11:
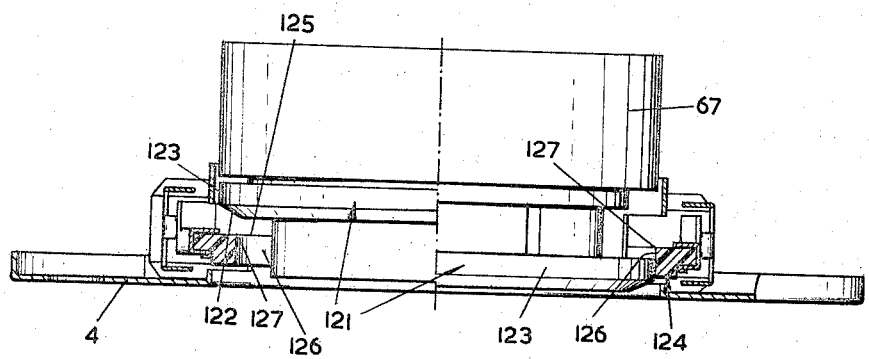
FIG. 11 is a view corresponding to FIG. 10 with another embodiment of the cooperating cam means of the rotor and stator.

In FIG. 11 the cam ring 121 is provided with a conical or inclined cam surface portion 122 and a cylindrical outer surface portion 123. The cam members 124 are provided with an upper surface 125 perpendicular to the rotor axis and a cylindrical surface 126. The directly joining surfaces 125 and 126 form a corner 127 to cooperate with the inclined ring cam surface portion 122 when the ring 121 and the members 124 move to or from their end position in which the cylindrical surfaces 123 and 126 bear on each other.

Figure 12:
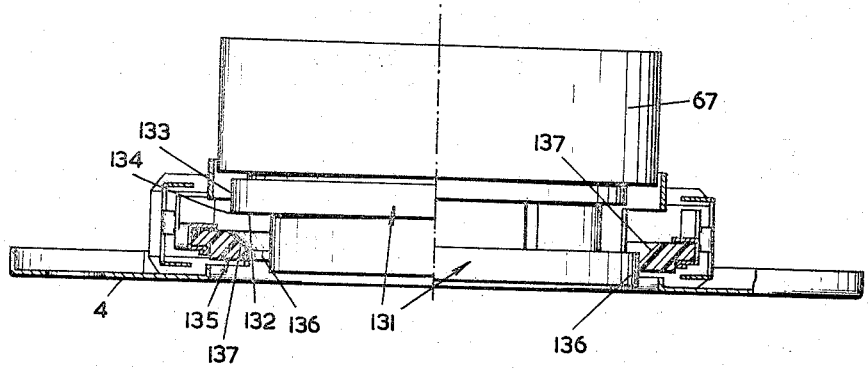
FIG. 12 is a view corresponding to FIG. 10 with still another embodiment of the cam means of the rotor and stator.

In FIG. 12 the cam ring 131 is provided with a lower surface 132 perpendicular to the rotor axis and a cylindrical surface 133 directly joining the surface 132 and forming a corner 134 therewith. The cam members 135 are provided with a cylindrical surface portion 136 and an inclined surface portion 137. When the cam means 131 and 135 move to or from their end position in which the surfaces 133 and 136 bear on each other, the corner 134 slides over the inclined surface portions 137.

I claim:

1. A centrifugally operated switch comprising a rotor and a stator, mounting means mounting an actuating ring, said mounting means comprising swinging members, each of said swinging members being mounted in said rotor and connected to said actuating ring pivotally about a respective one of a pair of parallel hinge axes, said pairs of parallel hinge axes of said swinging members respectively extending substantially perpendicular to the rotor axis and subsequently in different directions, each of said swinging members comprising an arm extending clockwise and another arm extending counter clockwise with respect to said axis, said clockwise extending arms each crossing a counter clockwise extending arm of another one of said swinging members, said actuating ring being floatingly supported by said swinging member arms.

2. A centrifugally operated switch according to claim 1, in which said actuating ring is supported by three of said swinging members, said arms of said swinging members extending beyond said axis, the respective hinge axes of each pair of said parallel hinge axes being situated at diametrically opposite sides of said rotor axis.

3. A centrifugally operated switch comprising, a driven rotor and a stator coaxial with said rotor, said rotor comprising a plurality of centrifugal weights spaced around the rotor axis of rotation, means mounting said centrifugal weights for radial reciprocable movement away from and toward said axis in response to centrifugal force, spring return means for returning said centrifugal weights in a direction toward said axis, a ring actuated by said centrifugal weights reciprocably in a direction axially of said axis between two operative positions, said ring having a bevelled surface and a cylindrical surface, said stator comprising electrical contacts operable between operative positions comprising a closed and an open position, means comprising at least one movable member to actuate said contacts to one of said operative positions, said movable member having a bevelled surface slidably engageable by said ring bevelled surface when said ring is in movement from said operative positions in response to movement of said centrifugal weights, the movable member and ring bevelled surfaces being disposed slidable relatively to each other and to cause said movable member to move radially outwardly when engaged by said ring and in response to axial travel to said ring subsequent to engagement with said movable member, and said cylindrical surface of said ring engaging said movable member when said ring is in the other of said operative positions.

4. A centrifugally operated switch according to claim 3, including means comprising a spring biasing said contacts to a closed condition and urging said movable member in a direction in opposition to the direction of movement imparted to said movable member by said ring and biasing said movable member to a position for engagement by said ring during said axial travel of said ring.

5. A centrifugally operated switch according to claim 3, including pivotal means pivotally mounting said movable member about an axis parallel to said rotor axis.

6. A centrifugally operated switch according to claim 5, in which said pivotal means comprises ball means.

7. A centrifugally operated switch according to claim 3, said means to actuate said contacts including another movable member having a bevelled surface engaged by said ring bevelled surface for actuating said contacts to said one of said operative positions, two pivotally mounted, mutually articulated bell crank levers each having an arm engaging a respective one of said movable members, said bell crank levers each having other arms biasing one of said contacts to one of said operative positions.

8. A centrifugally operated switch according to claim 7, in which said other arms are disposed biasing said one contact to one operative position in which said contacts are open.

9. A centrifugally operated switch according to claim 7, including a spring biasing said bell crank levers in a direction for biasing said movable members radially inwardly toward said axis.

10. A centrifugally operated switch comprising a rotor and a stator, said rotor being rotatable with respect to said stator about a main axis defining axial and perpendicular thereof radial directions in said switch, said rotor comprising a plurality of centrifugal weights spaced around said axis, means mounting said centrifugal weights for radial reciprocable movement, spring return means urging said centrifugal weights radially inwardly, rotor cam means, means mounting said rotor cam means in a predetermined rotational relationship about said axis to said rotor for reciprocable movement in response to reciprocating movement of said centrifugal weights, said stator comprising electrical contact means operable between operative positions comprising an open and a closed position, stator cam means, means mounting said stator cam means in a predetermined rotational relationship about said axis to said stator for reciprocable movement to operate said contact means, said rotor and said stator cam means comprising operative cam surfaces disposed for mutual engagement of said operative cam surfaces to define directly co-operating cam means, said directly co-operating cam means comprising a cam ring mounted in the stator coaxially with said main axis for axial reciprocable movement and at least one cam member mounted for radial reciprocable movement, said cam member being disposed engageable with a peripheral portion of said cam ring, at least one of said operative cam surfaces comprising an operative cam surface portion inclined to said rotor axis, said inclined operative cam surface portion having as a continuation thereof an operative cam surface portion extending parallel to the direction of the reciprocable movement of said rotor cam means and which is an engaged cam surface portion if said rotor and said stator cam means co-operate in one terminal position of their reciprocating movement, means mounting at least three of said cam members in the rotor, swinging members extending substantially in the direction of said main axis pivotally mounted in said rotor, means pivotally linking each cam with one of said swinging members, and said cam members in one terminal position of their reciprocating movement bearing on an axial end surface of said ring and supported in the direction of said main axis by said swinging members.

11. A centrifugally operated switch comprising a rotor and a stator, said rotor being rotatable with respect to said stator about a main axis defining axial and perpendicular thereof radial directions in said switch, said rotor comprising a plurality of centrifugal weights spaced around said axis, means mounting said centrifugal weights for radial reciprocable movement, spring return means urging said centrifugal weights radially inwardly, rotor cam means, means mounting said rotor cam means in a predetermined rotational relationship about said axis to said rotor to allow rotation thereabout and reciprocable movement axially of said axis in response to reciprocating movement of said centrifugal weights, said stator comprising electrical contact means operable between operative positions comprising an open and a closed position, stator cam means, means mounting said stator cam means in a predetermined rotational relationship about said axis to said stator for reciprocable movement to operate said contact means, said rotor and said stator cam means comprising operative cam surfaces disposed for mutual engagement defining directly co-operating cam means, said directly co-operating cam means comprising a cam ring having a peripheral portion and mounted coaxially with said main axis for axial reciprocable movement and at least one cam member mounted for radial reciprocable movement, said cam member being disposed engageable with a peripheral portion of said cam ring, at least one of said operative cam surfaces defining an operative cam surface portion inclined to said rotor axis, said inclined operative cam surface portion having as a continuation thereof an operative cam surface portion extending parallel to said main axis and engaged if said rotor and said stator cam means co-operate in one terminal position of their reciprocating movement.

References Cited
UNITED STATES PATENTS 2,846,540   8/1958   Neal _____ 200—80
2,991,655   7/1961   Jorgensen et al. _____ 200—80

BERNARD A. GILHEANY, *Primary Examiner.*

H. A. LEWITTER, *Assistant Examiner.*